April 15, 1958 R. P. DELANO, JR 2,831,186
RADAR SCANNER WITH FIGURE EIGHT BEAM MOTION
Filed Feb. 8, 1954 2 Sheets-Sheet 1

INVENTOR.
RAYMOND P. DELANO, JR.

April 15, 1958 R. P. DELANO, JR 2,831,186
RADAR SCANNER WITH FIGURE EIGHT BEAM MOTION
Filed Feb. 8, 1954 2 Sheets-Sheet 2

INVENTOR.
RAYMOND P. DELANO JR.
BY Jerome P. Bloom
Wade Koontz AND
ATTORNEYS

United States Patent Office 2,831,186
Patented Apr. 15, 1958

2,831,186

RADAR SCANNER WITH FIGURE EIGHT BEAM MOTION

Raymond P. Delano, Jr., Wilmington, Del., assignor to the United States of America as represented by the Secretary of the Air Force Application February 8, 1954, Serial No. 409,013

9 Claims. (Cl. 343—100)

This invention relates to an improved radar scanner mechanism employing a figure eight beam motion.

In the radar scanning art the objects are: to look at a conical volume in space with a radar beam which is of such size and shape that generally several traverses of the beam are necessary to cover the field to look at the field in a relatively short time which, of course, calls for a high rate of beam traverse, and to look at all parts of the field as regularly and evenly as possible which calls for a constant rate of beam traverse if a constant pulse repetition rate is used.

There are several possible methods and mechanisms which have been employed to traverse a field of scan but this invention produces a novel method and mechanism which is of a highly improved and simple nature with results that surpass the methods and mechanisms of the prior art. For example, in employing a saw tooth scan the practice has been to cause the reflector employed to nod and sweep together so that no part of the field will be missed. If the nod is relatively faster than the sweep it must make two rapid reversals in a cycle while the sweep is advancing only one beam width at essentially constant rate. At high scan rates these frequent reversals cause high inertia loads on the reflector nod mechanism.

If an attempt is made to alter this motion of the reflector from harmonic towards linear motion to obtain a more regular view of the field this inertia load is aggravated due to acceleration of the reflector. For example, a nod motion which is linear over 80% of the movement with harmonic reversal causes acceleration of the reflector two and a half times as great as pure harmonic motion.

If the beam could be caused to traverse the field in nod and held stationary in sweep then advanced one beam width in sweep and nodded the other way it will make a cycle while the sweep advances intermittently for two beam widths. This increases the nod time for a cycle by twice and decreases the inertia loads by over one-half but the trouble that results in this instance is due to the intermittent motion and its effects at high speeds.

The mechanism which is the subject of this invention provides a combination of nod and sweep movements of the scanner retaining the advantage of low inertia loads while having constant sweep movement. This is accomplished by causing the nod mechanism alone to drive the reflector with a compound motion so the center of the beam intercept on a plane in space will follow a modified figure eight path of which the crossed center lines are essentially straight and connected by loops at the respective ends, the height being equal to the nod scan and the width being equal to approximately one beam width. By moving the reflector in sweep in properly timed relationship to the nod, which provides the modified figure eight path of scan for a reflector while it is relatively stationary in sweep, a point moving along the figure eight path will describe a path in space consisting of vertical lines joined alternately at top and bottom to the adjoining lines by half loops. A harmonic corrector is employed in the novel scanner control mechanism to approximate a constant nod scan rate over a considerable portion of the field.

An object of this invention is to utilize a novel scan pattern which views a volume in space completely and yet without overlap of the beam pattern thus reducing to a minimum the movements of the scanner mechanism whereby the scanner can be run at higher speed.

Another object of this invention is to provide an improved radar scanner mechanism.

A further object of this invention is to provide an improved radar scanner mechanism providing a figure eight beam motion in nod whereby inertia loads are minimized.

An additional object of the invention is to provide an improved scanner control mechanism wherein nod mechanism alone will drive a reflector with a compound motion.

Another object of the invention is to provide an improved scanner control mechanism which employs a harmonic corrector to smooth the operation of the scanner increasing its efficiency.

An additional object of the invention is to employ a nod control mechanism for a scanner which provides a figure eight beam motion on a plane in space in conjunction with a sweep control where by the figure eight is expanded to form a linear scan of a major portion of the field.

Other objects and advantages of the invention will be readily apparent to those versed in the art from the following description taken in conjunction with the accompanying drawings wherein.

Figure 1:
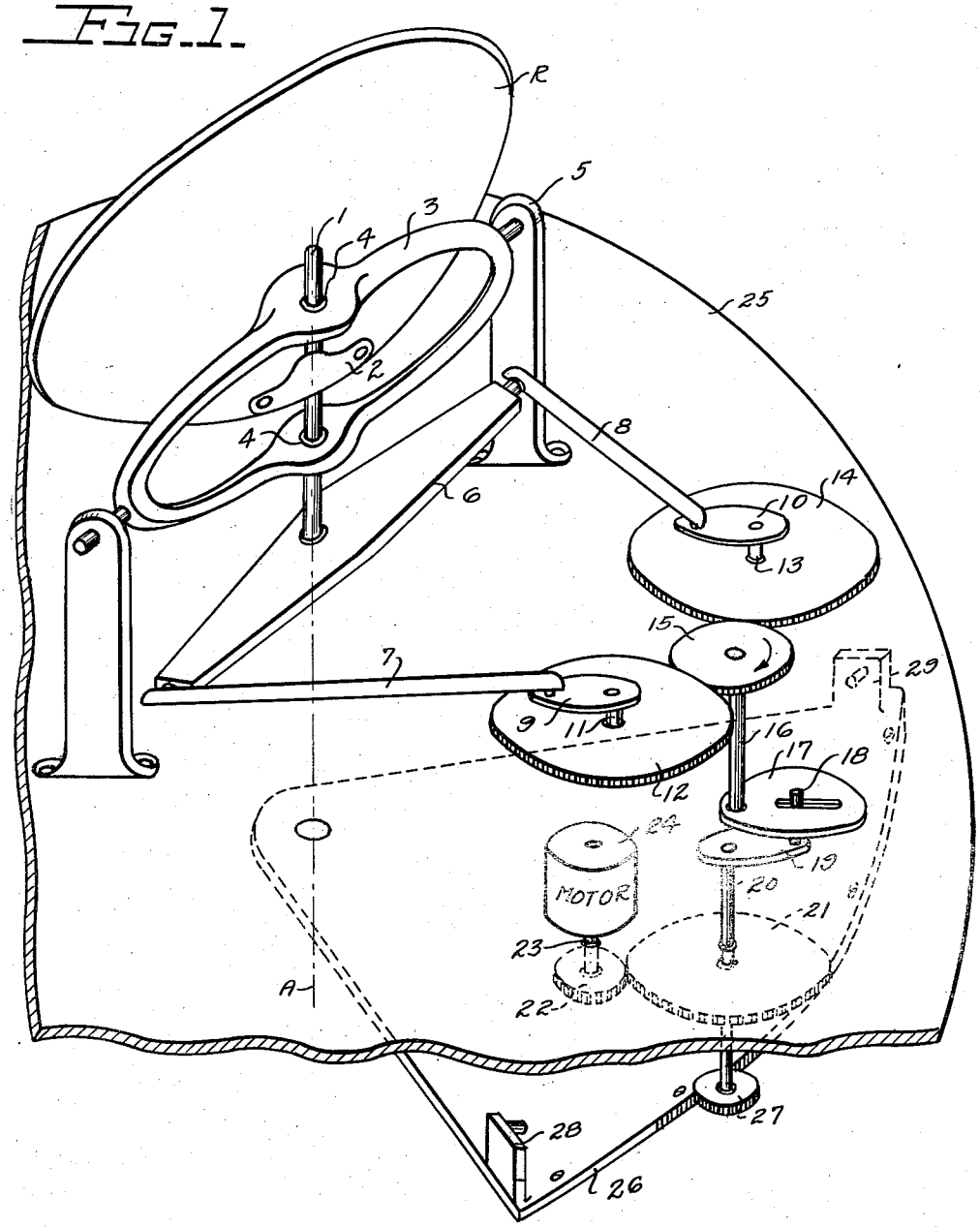
Fig. 1 is a partial perspective view on the apparatus of the invention.

As shown in Fig. 1 of the drawings a reflector R is fixed to a vertical shaft 1 by bracket 2 which shaft is rotatably supported in gimbal 3 in bearings 4 therein. The gimbal 3 is rotatably supported in brackets 5 secured to the supporting frame 25 for rotation about a horizontal axis. This horizontal axis is called the nod axis and movement of reflector R about the nod axis can be referred to as nod of the reflector. The shaft 1 defines what is called the wobble axis about which the reflector has wobble movement. To the shaft 1 at its lower end is fixed a control bar 6 either end of which has integral therewith the male element of a ball and socket joint by which the control bar is connected to links 7 and 8 respectively. The other ends of the links are connected by similar ball and socket joints to crank arms 9 and 10 respectively. The crank arm 9 is fixed to a shaft 11 of gear 12 which drives the crank arm 9. The crank arm 10 is fixed to a shaft 13 of a smiliar gear 14 which drives crank arm 10. A harmonic corrector gear 15 is mounted in driving relation with both gears 12 and 14 to drive them both in the same direction. The gear shaft 16 of gear 15 is connected at its lower end to a slotted link 17 which is a harmonic corrector. Guided in the slot of the link 17 and controlling the movement thereof is a control pin 18 fixed to a crank arm 19 connected on shaft 20 supported for rotation by frame 25 which shaft has a gear 21 driven by a driving gear 22 on a shaft 23 from a reversible control motor 24 on the frame, support, or platform 25. The supporting frame 25 carries the brackets 5 and the gear mechanism including elements 9–24. This frame, support, on platform 25 is rotatable on an axis A vertical to a fixed gear sector 26. The axis A is called the sweep axis or axis of azimuth movement of the scanning system. The scanning system in its entirety embraces the platform 25 and all the parts thereon. The reflector R, one of these parts, is the scanning element proper of the scanning system. This element R serves as a directional antenna radiating a space scanning radar beam. The element R may be called a reflector, a scanning element, an antenna, a directional antenna, a beaming element, or the like. At the lower extremity of the shaft 20 is fixed a gear 27 meshing with the teeth on the periphery of the fixed gear sector 26. At the extremities of the arc of the gear sector are fixed limit switches 28 and 29 operatively associated with the motor 24 for the frame 25 to limit its rotative movement.

Figure 2:
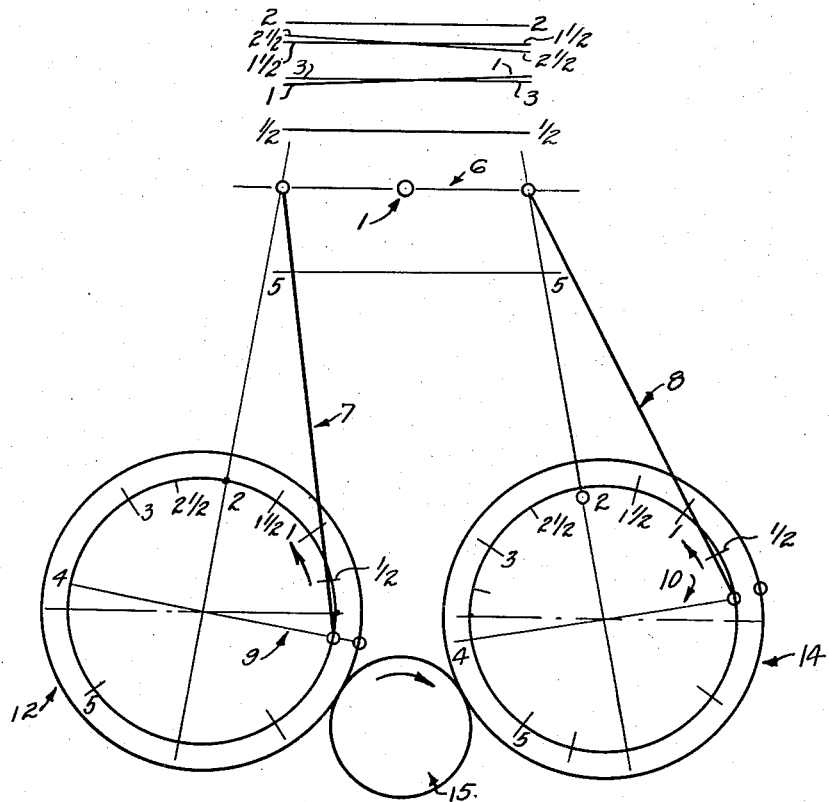
Fig. 2 is a diagrammatic showing of motions of certain control parts of the beam reflector or antenna of the scanning system.
Figure 3:
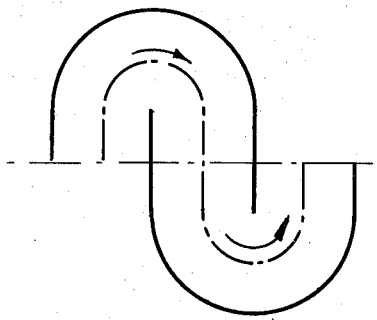
Fig. 3 shows the resulting beam path in space obtaining by the invention.

In the operation of the device the motor 24 is started, driving gear 21 and driven shaft 20. The gear 27 meshing with the fixed gear sector starts its movement relative thereto causing rotation of the frame and connected mechanism in azimuth sweep about the sweep axis A. Simultaneously the crank arm 19 driven by shaft 20 controls the pin 18 to control the movement of the harmonic corrector 17 whereby the harmonic corrector gear 15 simultaneously drives the gears 12 and 14 and connected crank arms 9 and 10 which control the movement of control bar 6 through links 7 and 8. The phase relationship of the crank arms is established so that both control points on the arms reach the ends or centers of their respective strokes simultaneously. The movement of the control bar 6 by the links from the crank arms causes the reflector shaft to nod about the horizontal axis defined by the pivoting gimbal 3 in brackets 5. Reference is made to Fig. 2 to define the nodding application resulting from the applied forces. There is produced a compound motion in that the crank arm relationship also produces a small rotative movement of the shaft which may be seen in the diagrammatic showing of control bar 6 in its various positions so that the beam projected on a plane in space from the reflector in a position fixed as to sweep is that of a modified figure eight. The azimuth sweep of the frame or platform 25 with its connected reflector and nod and wobble mechanism causes the figure eight to be expanded to produce substantially linear vertical scan lines as modified by the harmonic corrector with such lines joined alternatively at top and bottom to the adjoining lines by half loops, as indicated in Fig. 3, where the heavy dot-dash line represents the wave form in a space plane of the center of the beam intercept. The height of this wave form to either side of the horizontal, light dot-dash line, which represents the nod axis, indicates the up or down amplitude of the center of the beam intercept.

Fig. 2 it is noted specifically shows in diagrammatic fashion how the motion of the control member 6 is effected by the crank arms to cause the nodding movement of the connected reflector as well as the slight rotation of shaft 1 whereby the figure eight beam motion obtains. The Fig. 2 is self-explanatory so no detailed discussion thereof appears necessary other than to point out that the index numbers ½, 1, 1½, etc. indicate corresponding positions of the cranks 9 and 10 and the member 6.

The mechanism including cranks 9, 10, rods 7, and connector element 6 produces harmonic motion of the reflector R in nod and wobble directions, and this mechanism may be referred to as harmonic motion mechanism or the like. If uncorrected, the harmonic motion of the beam form radiated from element R is characterized by maximum velocity at the center of the beam form or field and minimum velocity at the edges or reversal points. The harmonic corrector slows down the beam velocity at the center of the field and speeds it up at its edges to smooth out the velocity changes of the crank motion at the center of the field. The scan is speeded up at its reversal points thus approximating more nearly a linear scan over a large portion of the nod motion. For example, for an 80% linear scan the velocity at the center of the nod should be reduced approximately in the ratio of 1:1.4. The harmonic corrector drives the cranks at half its speed so that the correction is applied on both the up and down nod. Fig. 3 generally shows the type of scan developed.

Accordingly the invention provides a novel radar scanner control mechanism that utilizes a modified figure eight nod and wobble motion in conjunction with a sweep motion to obtain linear scan of a major portion of the swept field. Moreover there is a directional and velocity locked in phase relationship of the motions involved.

While a particular embodiment and application of the invention has been described herein, modifications of the disclosed embodiment and other applications of the invention will be readily apparent to those versed in the art and such is considered within the scope of the invention.

What is claimed is:

1. Apparatus for scanning comprising a frame, means mounting the frame for movement about a sweep axis, a beam radiating element, a shaft fixed to said element, a gimbal, said shaft being rotatively mounted in said gimbal, means mounting said gimbal on said frame for rotation about a nod axis perpendicular to said shaft, crank means connected to said shaft and operable to impart a figure eight beam configuring motion to said element about the nod axis and about the axis defined by said shaft, and control means for said crank means operatively associated with said frame to rotate said frame in sweep in timed relationship to the actuation of the element about the nod axis and the shaft axis whereby a linear scan obtains over a major portion of the field swept.

2. Apparatus for scanning comprising a platform mounted for rotation about one axis, a scanner element, means mounting the scanner element on the platform for movement about two axes substantially at right angles to each other, mechanism connected to said scanner element operable to effect a figure eight motion thereof about its said two axes, and drive means to actuate said platform about its said one axis and to actuate said mechanism simultaneously whereby operation of said drive means a linear scan obtains over a major portion of the swept field.

3. Apparatus for scanning comprising a platform mounted for oscillation about a sweep axis, a scanner element, means mounting the scanner element on said platform for movement about two axes substantially at right angles to each other, mechanism connected to said scanner element operable to impart a figure eight motion thereto about its said two axes, and drive means for actuating said mechanism and oscillating said platform about its sweep axis in timed relationship so as to effect a displacement in space of the figure eight motion of the scanner element so that a scan pattern of substantially straight lines connected at successively alternate ends by half loops obtains.

4. A scanning system including a supporting frame, a beam projecting element mounted on the frame for compound oscillation relative to said frame about coordinate axes, and means to effect this oscillation of the element in a pattern producing a figure eight configuration of the projected beam, said means including harmonic motion mechanism connected to the element, drive mechanism, and a harmonic corrector transmission between the drive mechanism and the harmonic motion mechanism.

5. A scanning system including a reflector for projecting a beam, a platform, means mounting the reflector on the platform for compound oscillation relative to the platform about coordinate nod and wobble axes, drive mechanism, and connections between the drive mechanism and said reflector for effecting said oscillation of the reflector in a pattern producing a figure eight configuration of the projected beam relative to the platform.

6. A scanning system as defined in claim 5, said connections including harmonic motion mechanism acting on the reflector, and a harmonic motion corrector transmission between the drive mechanism and the harmonic motion mechanism.

7. A scanning system as defined in claim 5, said connections including a bar fixed to the reflector in offset relation to the nod axis and crank-and-rod means to effect translational and rocking motions of the bar in timed relation, with the translational motion producing the component of compound oscillation of the reflector about the nod axis and the rocking motion producing the component of compound oscillation of the reflector about the wobble axis.

8. A scanning system including a reciprocatable supporting frame, a beam projecting element, means mounting the element on the frame for compound oscillation relative to the frame about coordinate axes, means to effect the oscillation of the element in a pattern producing a figure eight configuration of the projected beam relative to the frame, and means for reciprocating said frame to modify the figure eight configuration of the projected beam in space.

9. A scanning system including a platform oscillatable about a sweep axis, a radar beam projecting element, means mounting the element on the platform for compound nod and wobble oscillation about coordinate nod and wobble axes, means to actuate the element for compound nod and wobble oscillation n a pattern producing a figure eight configuration of the beam relative to the platform, and means for concurrently oscillating the platform about the sweep axis to produce a resultant motion pattern of said element imparting a modified figure eight configuration to the beam in space.

References Cited in the file of this patent

UNITED STATES PATENTS

| | | |
|---|---|---|
| 2,410,827 | Langstroth et al. | Nov. 12, 1946 |
| 2,660,722 | Ley et al. | Nov. 24, 1953 |
| 2,678,394 | Curtis | May 11, 1954 |